Aug. 26, 1952     W. A. BEDFORD, JR     2,607,971
PANEL FASTENER DEVICE
Filed Feb. 5, 1947
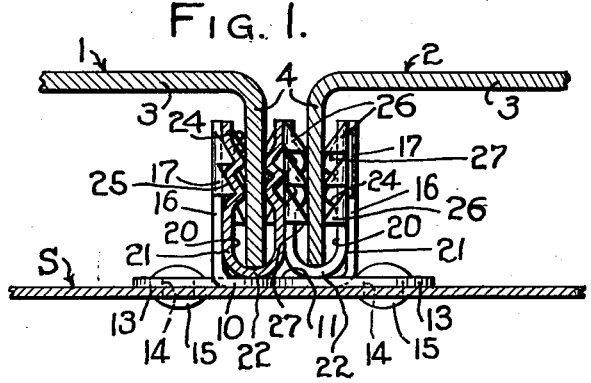
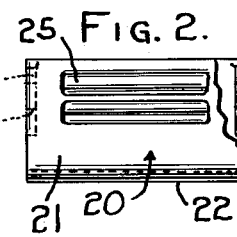
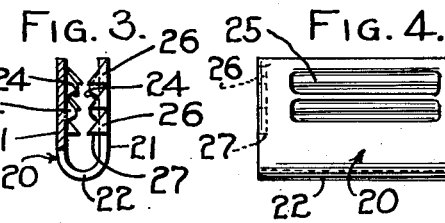
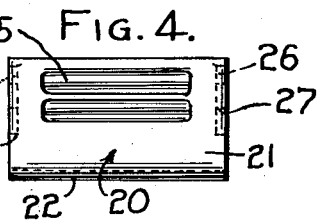
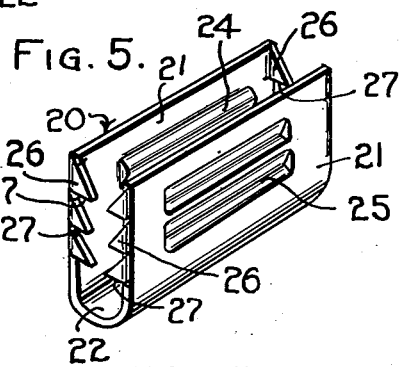
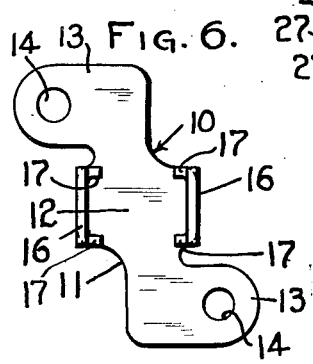
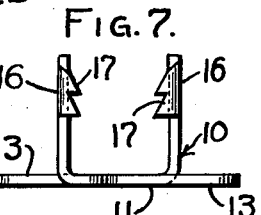
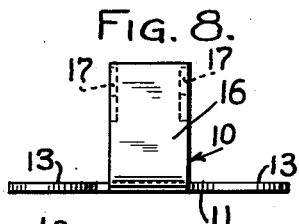
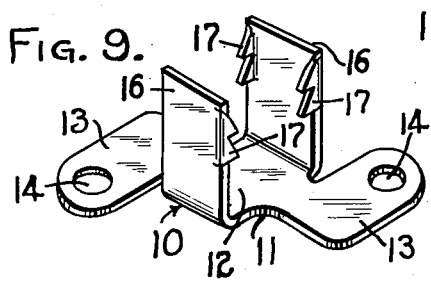
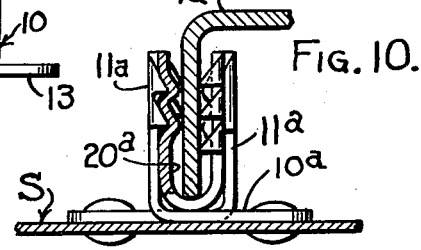
Inventor,
WILLIAM A. BEDFORD, JR.
By John Todd
Attorney Patented Aug. 26, 1952

2,607,971

UNITED STATES PATENT OFFICE 2,607,971

PANEL FASTENER DEVICE

William A. Bedford, Jr., Hingham, Mass., assignor to United-Carr Fastener Corporation, Cambridge, Mass., a corporation of Massachusetts Application February 5, 1947, Serial No. 726,582

5 Claims. (Cl. 24—73)

The present invention relates to fastener members, and more particularly to fasteners for securing one or more flanged members together.

One of the objects of the invention is the provision of an improved fastener for securing together two flanged members, as for example, flanged panels as are commonly employed as store front sections.

A further object of the invention is the provision of an improved fastener member for securing a plurality of parts to a support disposed in a plane normal thereto.

A further object of the invention is the provision of an improved fastener for securing a plurality of flanged metal parts together and to a support in such manner as to allow for expansion and construction of the parts.

The above and other objects of the invention will be apparent to persons skilled in the art from a consideration of the accompanying drawings and annexed specification illustrating and describing a preferred embodiment of the invention.

In the drawings

Fig. 1 is a longitudinal sectional view of a panel-secured installation embodying a fastener of the present invention, one of the clips being shown in cross section and one in elevation;

Fig. 2 is a front elevation, with one end portion broken away, of a panel-engaging clip of the fastener;

Fig. 3 is an end elevation, partly in section, of the panel clip shown in Fig. 2;

Fig. 4 is a rear face elevation of the clip shown in Figs. 2 and 3;

Fig. 5 is a perspective view of the clip shown in Figs. 2, 3 and 4;

Fig. 6 is a top plan view of the anchoring part of the fastener;

Fig. 7 is a front elevation thereof;

Fig. 8 is a side elevation thereof;

Fig. 9 is a detail perspective view of the anchoring part of the fastener; and

Fig. 10 is a sectional view similar to Fig. 1, but illustrating a fastener embodying a single supported part-engaging clip.

In many installations, as for example store fronts, it is desirable to secure a pair of flanged panels to a support in slightly spaced aligned relation.

In some instances the panels or members to be supported are provided with angularly extending marginal side flanges or webs, and it is desirable that the fasteners or securing means engage such flanges rather than an exposed face thereof. Furthermore, in many instances it is desirable that the fastening devices engage an imperforate part or flange to avoid the necessity, and in some cases, the difficulty of drilling fastener-receiving apertures in such parts.

For purposes of illustration, I have elected to show an embodiment of the invention accomplishing all of the above stated desirable results, though it will be appreciated that certain novel features of the invention are adaptable to individual results.

Referring to the drawings, the invention provides an improved fastener for securing one or more parts 1 and 2 to a support S. The parts 1 and 2 may be flanged parts, each having a body portion 3 and an angularly disposed marginal web or side flange 4, and preferably the parts 1 and 2 are secured together in spaced aligned relation to the support S. In the illustrated embodiment the body portions 3 of the parts 1 and 2 are disposed parallel to the support though it will be appreciated that the invention provides means for securing a web or plate-like member in right angular spaced relation to the support S.

The fastener of the present invention comprises an anchor or retainer member 10 adapted to be secured to the support S and one or more yieldable part-attaching members or clips 20 adapted to grip the part 1 or 2 to be supported, and preferably the flanges 4 thereof are to be interlocked with the retainer or anchor 10.

The retainer or anchor member 10 (see Figs. 6, 7, 8 and 9) may comprise a base 11 having a body portion 12 provided with attaching wings 13 extending from opposite sides of the body portion which wings may be apertured as at 14 to receive rivets 15 or the like for securing the base 11 to the base 3. The wings 13 may be in the form of angular extensions so that with the base there is presented generally an S or Z form, as shown in Fig. 6.

The anchor member 10 also is provided with spaced opposed gripping members which may be in the form of plates 16 extending from opposed intermediate side edges of the body portion 12 in a direction normal thereto, and the edge portions of these plates are preferably formed with pairs of opposed inwardly facing ratchet or gripping means 17 for fastening engagement with the attaching clips 20 as will hereinafter appear. The base 11 is preferably formed of relatively stiff, yet resilient sheet metal, for example carbon-steel which may be heat-treated for strength and necessary stiffness, and the wings 16 are preferably so spaced as to be yieldingly forced outwardly by a clip or clips disposed between them so as to engage and grip the clips 20 under tension.

The part-attaching members 20 (Figs. 2 to 5 inclusive) advantageously may be in the form of two U-shaped clips having opposed side walls 21 connected along one edge of each by a U-shaped bight portion 22. One of these clips is adapted to embrace a terminal edge portion of the member 1 and another the terminal edge portion of the member 2, for example, the terminal edges of the flanges 4 as shown in Fig. 1. A substantial area of each side portion is deformed as by stamping to form a transverse series of elongated ratchet shaped deformations presenting inwardly directed superposed ratchet shaped portions 24 and outwardly facing superposed ratchet shaped recesses 25. The opposed wall portions 21 are also formed at one or both ends with inwardly extending flanges 26 having ratchet toothed edges 27. The clips 20 are preferably formed of stiff resilient sheet metal, and the walls 21 are so spaced that they will be expanded when slipped over a part to be supported, causing the teeth 27 to engage and grip the part under tension. Inasmuch as the teeth 27 are ratchet shaped and taper toward the open end of the clip, the attaching members are easily slipped over the free edges of the web side flanges 4 as will be apparent.

When it is desired to connect together two panel members 20—20, as shown in Fig. 1, attaching clips 1 and 2 are affixed to the edges of the flanges 4 and the two are placed in side-by-side abutting relation. In such relation they may be slipped into the anchor member 10 the teeth 17 of which lock in the recesses 25 of the clips 20. The combined tension of clip sides 21 and the wings 13 causes the teeth 27 to securely grip flange 4 of the panel member 1 or 2.

The resilience of the fastener as above described is sufficient to allow for expansion and contraction of the parts 1 and 2 due to temperature changes.

The fastener of the invention is also applicable to the attachment of a single panel 1a to a support, in which case a single clip 20a is slip-fitted over a terminal edge of the part 1a and is locked between the toothed wings 11a of the anchor member 10a.

Although I have illustrated and described my invention with reference to two embodiments thereof, I do not intend to be limited thereby as the scope of the invention is best defined in the appended claims.

I claim:

1. A fastener device, including, in combination, a pair of attaching clips, each attaching clip having opposed side walls connected by a U-shaped bight portion along one end of each side wall and opposed inwardly extending teeth along the side edges of said side wall for engaging a web of a part to be supported, said clips being disposed with the outer surface of a side wall of each in bearing engagement with the outer surface of a side wall of the other, and an anchor clip member of resilient material having a base adapted for attachment to a support and opposed gripping members extending substantially parallel each other from said base in gripping engagement with the opposite side walls of said clips, one with each of the other of said walls.

2. A fastener device, including, in combination, a pair of attaching clips, each attaching clip being of U-shaped cross section and having opposed side walls connected together by a bight portion and opposed inwardly extending teeth along the side edges of said side walls for engaging the web of a part to be supported, said clips being disposed in substantially parallel relation with a side wall of one in engagement with a side wall of another, the other side wall of each of said clips having ratchet-like deformations, and an anchor clip member of resilient material having a base adapted for attachment to a support and opposed gripping members extending from said base and having teeth in cooperating gripping engagement with the ratchet-shaped deformations of said other side walls of said clips.

3. A fastener device including in combination, an attaching clip of general U-shaped cross section having opposed elongated side walls connected by a bight portion and opposed tiers of inwardly extending teeth along the free edges of said side walls for gripping engagement with opposed faces of a part to be supported, at least one of the side walls of said attaching clip being provided with a tier of female deformations, and an anchor clip member having a base provided with means for attachment to a support, and opposed gripping members extending substantially parallel to each other and perpendicularly to said base and provided with means for interlocking gripping engagement with the female deformations of said attaching clip.

4. A fastener device including in combination, an attaching clip of general U-shaped cross section having opposed elongated side walls connected by a bight portion and opposed tiers of inwardly extending teeth along the free edges of said side walls for gripping engagement with opposed faces of a part to be supported, at least one of the side walls of said attaching clip being provided with a tier of female deformations, and an anchor clip member having a base provided with means for attachment to a support, and opposed gripping members extending substantially parallel to each other and perpendicularly to said base and provided with opposed sets of inwardly directed teeth for interlocking gripping engagement with the female deformations of said attaching clip.

5. A fastener device including in combination, an attaching clip of general U-shaped cross section having opposed elongated side walls connected by a bight portion and opposed tiers of inwardly extending teeth along the free edges of said side walls for gripping engagement with opposed faces of a part to be supported, at least one of the side walls of said attaching clip being provided with a tier of female deformations, and an anchor clip member having a base provided with means for attachment to a support, and opposed gripping members extending substantially parallel to each other and perpendicularly to said base and provided with means for interlocking gripping engagement with the female deformations of said attaching clip, said anchor clip gripping members beng of less length than the female deformations of said attaching clip.

WILLIAM A. BEDFORD, Jr.

REFERENCES CITED

The following references are of record in the file of this patent:

UNITED STATES PATENTS

| Number | Name | Date |
|---|---|---|
| 1,065,810 | Johnson | June 24, 1913 |
| 1,266,547 | Baxter | May 21, 1918 |
| 1,726,500 | Norris | Aug. 27, 1929 |
| 2,009,512 | Offutt et al. | July 30, 1935 |
| 2,186,469 | Wolf | Jan. 9, 1940 |
| 2,216,219 | Wiley | Oct. 1, 1940 |
| 2,226,679 | Walters | Dec. 21, 1940 |
| 2,247,975 | Tinnerman | July 1, 1941 |
| 2,275,773 | Kost | Mar. 10, 1942 |
| 2,490,663 | Van Uum | Dec. 6, 1949 |